US 8,459,562 B1

(12) United States Patent
Field et al.

(10) Patent No.: US 8,459,562 B1
(45) Date of Patent: *Jun. 11, 2013

(54) SYSTEM AND METHOD FOR PROCESSING TRANSACTIONS USING A MULTI-ACCOUNT TRANSACTIONS DEVICE

(75) Inventors: Manning R. Field, Media, PA (US); Walter Brent Reinhard, Lansdale, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 610 days.

This patent is subject to a terminal disclaimer.

(21) Appl. No.: 12/557,921

(22) Filed: Sep. 11, 2009

Related U.S. Application Data

(63) Continuation of application No. 11/968,018, filed on Dec. 31, 2007, now Pat. No. 7,766,244.

(51) Int. Cl.
*G06K 19/06* (2006.01)

(52) U.S. Cl.
USPC ............. 235/492; 235/493; 235/380; 705/38; 705/39

(58) Field of Classification Search
USPC .................... 235/380, 487, 492, 493; 705/38, 705/39
See application file for complete search history.

(56) References Cited

U.S. PATENT DOCUMENTS

| | | | |
|---|---|---|---|
| 2,005,003 A | 6/1935 | Patton et. al. | |
| 3,653,480 A | 4/1972 | Yamamoto et al. | |
| 3,938,090 A | 2/1976 | Borison et al. | |
| 4,050,375 A | 9/1977 | Orleans | |
| 4,141,078 A | 2/1979 | Bridges et al. | |
| 4,205,780 A | 6/1980 | Burns | |
| 4,264,808 A | 4/1981 | Owens et al. | |
| 4,321,672 A | 3/1982 | Braun et al. | |
| 4,385,285 A | 5/1983 | Horst et al. | |
| 4,396,985 A | 8/1983 | Ohara | |
| 4,443,027 A * | 4/1984 | McNeely et al. | 283/83 |
| 4,453,074 A | 6/1984 | Weinstein | |
| 4,454,414 A | 6/1984 | Benton | |

(Continued)

FOREIGN PATENT DOCUMENTS

| EP | 421808 | 4/1991 |
|---|---|---|
| EP | 0665486 | 8/1995 |

(Continued)

OTHER PUBLICATIONS

Hunt, Robert M., An Introduction to the Economics of Payment Card Networks.

(Continued)

*Primary Examiner* — Michael G Lee
*Assistant Examiner* — Tabitha Chedekel
(74) *Attorney, Agent, or Firm* — Hunton & Williams LLP

(57) ABSTRACT

A system and method for processing transactions using a multi-account transaction device. The method comprises the steps of: receiving at least one transaction particular relating to a transaction conducted with a multi-account transaction device; determining at least one first desired account associated with the multi-account transaction device to which the transaction will be posted; posting the transaction to the at least one first desired account; receiving at least one second desired account to which at least a portion of the transaction should be posted; posting the at least a portion of the transaction to the at least one second desired account; and reconciling the at least one first desired account.

13 Claims, 6 Drawing Sheets

| Account | Default Transactions | Rules/Parameters |
|---|---|---|
| 310 | Gasoline | Merchant |
| 312 | Groceries | Merchant; Product |
| 314 | Entertainment | Merchant; Date/Time |
| 316 | Business | Merchant; Product; Date/Time |
| 318 | Miscellaneous | Cannot Determine Account |

U.S. PATENT DOCUMENTS

| | | | |
|---|---|---|---|
| RE31,692 E | 10/1984 | Tyburski et al. |
| 4,495,018 A | 1/1985 | Vohrer |
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers |
| 4,650,981 A | 3/1987 | Foletta |
| 4,669,730 A | 6/1987 | Small |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian, Jr. |
| 4,701,601 A | 10/1987 | Francini et al. |
| 4,713,761 A | 12/1987 | Sharpe et al. |
| 4,752,676 A | 6/1988 | Leonard et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,817,949 A | 4/1989 | Bachman et al. |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,007,084 A | 4/1991 | Materna et al. |
| 5,023,904 A | 6/1991 | Kaplan |
| 5,025,139 A | 6/1991 | Halliburton, Jr. |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara et al. |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,308,121 A | 5/1994 | Gunn |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | VanHorn |
| 5,373,550 A | 12/1994 | Campbell |
| 5,382,784 A | 1/1995 | Eberhardt |
| 5,396,417 A | 3/1995 | Burks |
| 5,402,474 A | 3/1995 | Miller |
| 5,412,190 A | 5/1995 | Kopesec |
| 5,413,341 A | 5/1995 | Lieberman |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Powell |

| Patent No. | Date | Inventor |
|---|---|---|
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,463 A | 11/1998 | Houvener et al. |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,377 A | 3/1999 | Chapin, Jr. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,928,082 A | 7/1999 | Clapper, Jr. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,659 A | 10/1999 | Cahill et al. |
| 5,963,925 A | 10/1999 | Kolling et al. |
| 5,966,698 A | 10/1999 | Pollin |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin et al. |
| 5,991,749 A | 11/1999 | Morrill, Jr. |
| 5,991,750 A | 11/1999 | Craig |
| 6,000,832 A | 12/1999 | Franklin et al. |
| 6,002,767 A | 12/1999 | Kramer |
| 6,003,762 A | 12/1999 | Hayashida |
| 6,006,205 A | 12/1999 | Loeb et al. |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,048,271 A | 4/2000 | Barcelou |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmerman et al. |
| 6,098,053 A | 8/2000 | Slater |
| 6,098,070 A | 8/2000 | Maxwell |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,108,641 A | 8/2000 | Kenna et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,182,059 B1 | 1/2001 | Angotti et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |

| | | | | | | |
|---|---|---|---|---|---|---|
| 6,236,972 B1 | 5/2001 | Shkedy | | 6,954,896 B1 | 10/2005 | Dodrill et al. |
| 6,240,444 B1 | 5/2001 | Fin et al. | | 6,961,710 B1 | 11/2005 | Yanagisawa et al. |
| 6,243,689 B1 | 6/2001 | Norton | | 6,965,882 B1 | 11/2005 | Lapstun et al. |
| 6,267,292 B1 | 7/2001 | Walker et al. | | 6,970,259 B1 | 11/2005 | Lunt et al. |
| 6,278,981 B1 | 8/2001 | Dembo et al. | | 6,970,830 B1 | 11/2005 | Samra et al. |
| 6,278,996 B1 | 8/2001 | Richardson et al. | | 6,970,855 B2 | 11/2005 | Das et al. |
| 6,289,322 B1 | 9/2001 | Kitchen et al. | | RE38,957 E | 1/2006 | Laussermair et al. |
| 6,292,789 B1 | 9/2001 | Schutzer | | 6,999,938 B1 | 2/2006 | Libman |
| 6,301,379 B1 | 10/2001 | Thompson et al. | | 6,999,943 B1 | 2/2006 | Johnson et al. |
| 6,301,567 B1 | 10/2001 | Leong et al. | | 7,004,382 B2 | 2/2006 | Sandru |
| 6,304,858 B1 | 10/2001 | Mosler et al. | | 7,014,110 B2 | 3/2006 | Minowa et al. |
| 6,305,603 B1* | 10/2001 | Grunbok et al. ............... 235/379 | | 7,025,256 B1 | 4/2006 | Drummond et al. |
| 6,308,887 B1 | 10/2001 | Korman et al. | | 7,039,600 B1 | 5/2006 | Meek et al. |
| 6,321,212 B1 | 11/2001 | Lange | | 7,062,456 B1 | 6/2006 | Riehl et al. |
| 6,324,524 B1 | 11/2001 | Lent et al. | | 7,068,832 B1 | 6/2006 | Price et al. |
| 6,327,575 B1 | 12/2001 | Katz | | 7,070,095 B1 | 7/2006 | Gandel et al. |
| 6,338,047 B1 | 1/2002 | Wallman | | 7,072,864 B2 | 7/2006 | Brake, Jr. |
| 6,338,049 B1 | 1/2002 | Walker et al. | | 7,104,443 B1 | 9/2006 | Paul et al. |
| 6,341,724 B2 | 1/2002 | Campisano | | 7,133,846 B1 | 11/2006 | Ginter et al. |
| 6,343,279 B1 | 1/2002 | Bissonette et al. | | 7,163,153 B2 | 1/2007 | Blossom |
| 6,349,290 B1 | 2/2002 | Horowitz et al. | | 7,177,836 B1 | 2/2007 | German et al. |
| 6,349,972 B1 | 2/2002 | Geiger et al. | | 7,191,952 B2 | 3/2007 | Blossom |
| 6,363,164 B1 | 3/2002 | Jones et al. | | 7,194,437 B1 | 3/2007 | Britto et al. |
| 6,363,364 B1 | 3/2002 | Nel | | 7,200,255 B2 | 4/2007 | Jones et al. |
| 6,363,365 B1 | 3/2002 | Kou | | 7,228,155 B2 | 6/2007 | Saunders |
| 6,366,967 B1 | 4/2002 | Wagner | | 7,249,112 B2 | 7/2007 | Berardi et al. |
| 6,374,235 B1 | 4/2002 | Chen et al. | | 7,263,507 B1 | 8/2007 | Brake |
| 6,390,362 B1 | 5/2002 | Martin | | 7,312,707 B1 | 12/2007 | Bishop et al. |
| 6,393,409 B2 | 5/2002 | Young et al. | | 7,313,543 B1 | 12/2007 | Crane et al. |
| 6,405,173 B1 | 6/2002 | Honarvar et al. | | 7,317,823 B1 | 1/2008 | Price et al. |
| 6,405,181 B2 | 6/2002 | Lent et al. | | 7,337,148 B2 | 2/2008 | Xie et al. |
| 6,409,593 B1 | 6/2002 | Petrecca | | 7,349,884 B1 | 3/2008 | Odom |
| 6,411,947 B1 | 6/2002 | Rice et al. | | RE40,220 E | 4/2008 | Nichols et al. |
| 6,415,259 B1 | 7/2002 | Wolfinger et al. | | 7,380,707 B1 | 6/2008 | Fredman |
| 6,418,419 B1 | 7/2002 | Nieboer et al. | | 7,392,222 B1 | 6/2008 | Hamilton |
| 6,418,420 B1 | 7/2002 | DiGiorgio et al. | | 7,401,048 B2 | 7/2008 | Rosedale et al. |
| 6,418,430 B1 | 7/2002 | DeFazio et al. | | 7,401,731 B1 | 7/2008 | Pletz |
| 6,424,949 B1 | 7/2002 | Deaton et al. | | 7,413,113 B1* | 8/2008 | Zhu ............................... 235/375 |
| 6,434,159 B1 | 8/2002 | Woodward et al. | | 7,493,288 B2 | 2/2009 | Bishop et al. |
| 6,446,072 B1 | 9/2002 | Schulze et al. | | 7,526,449 B1 | 4/2009 | Blossom |
| 6,454,647 B1 | 9/2002 | Woodbury, Jr. | | 7,546,272 B2 | 6/2009 | Loy |
| 6,456,981 B1 | 9/2002 | Dejaeger et al. | | 7,587,363 B2 | 9/2009 | Cataline et al. |
| 6,460,020 B1 | 10/2002 | Pool et al. | | 7,624,068 B1 | 11/2009 | Heasley et al. |
| 6,485,922 B1 | 11/2002 | Erickson et al. | | 7,676,409 B1 | 3/2010 | Ahmad |
| 6,490,568 B1 | 12/2002 | Omara et al. | | 7,766,244 B1 | 8/2010 | Field et al. |
| 6,493,685 B1 | 12/2002 | Ensel et al. | | 7,913,903 B1 | 3/2011 | Jones et al. |
| 6,513,019 B2 | 1/2003 | Lewis | | 7,925,583 B2 | 4/2011 | Heasley et al. |
| 6,535,896 B2 | 3/2003 | Britton et al. | | 7,953,653 B2 | 5/2011 | Siggers et al. |
| 6,536,663 B1 | 3/2003 | Lozier et al. | | 7,954,708 B2 | 6/2011 | Blossom |
| 6,554,185 B1 | 4/2003 | Montross et al. | | 2001/0011222 A1 | 8/2001 | McLauchlin et al. |
| 6,560,581 B1 | 5/2003 | Fox et al. | | 2001/0018666 A1 | 8/2001 | Sugiyama et al. |
| 6,567,791 B2 | 5/2003 | Lent et al. | | 2001/0018739 A1 | 8/2001 | Anderson et al. |
| 6,574,350 B1 | 6/2003 | Rhoads et al. | | 2001/0027441 A1 | 10/2001 | Wankmueller |
| 6,574,377 B1 | 6/2003 | Cahill et al. | | 2001/0032139 A1 | 10/2001 | Debonnett, Jr. |
| 6,578,000 B1 | 6/2003 | Dodrill et al. | | 2001/0034663 A1 | 10/2001 | Teveler et al. |
| 6,578,015 B1 | 6/2003 | Haseltine et al. | | 2001/0037300 A1 | 11/2001 | Miyazaki et al. |
| 6,607,127 B2 | 8/2003 | Wong | | 2001/0037309 A1 | 11/2001 | St. Vrain |
| 6,609,113 B1 | 8/2003 | O'Leary et al. | | 2001/0038033 A1 | 11/2001 | Habib |
| 6,609,125 B1 | 8/2003 | Layne et al. | | 2001/0047334 A1 | 11/2001 | Nappe et al. |
| 6,629,081 B1 | 9/2003 | Cornelius et al. | | 2001/0047489 A1 | 11/2001 | Ito et al. |
| 6,631,849 B2 | 10/2003 | Blossom | | 2001/0051533 A1 | 12/2001 | Wietzke et al. |
| 6,636,615 B1 | 10/2003 | Rhoads et al. | | 2002/0012445 A1 | 1/2002 | Perry |
| 6,658,393 B1 | 12/2003 | Basch et al. | | 2002/0013728 A1 | 1/2002 | Wilkman |
| 6,661,910 B2 | 12/2003 | Jones et al. | | 2002/0023055 A1 | 2/2002 | Antognini et al. |
| 6,704,714 B1 | 3/2004 | O'Leary et al. | | 2002/0026394 A1 | 2/2002 | Savage et al. |
| 6,718,388 B1 | 4/2004 | Yarborough | | 2002/0032651 A1 | 3/2002 | Embrey |
| 6,721,715 B2 | 4/2004 | Nemzow | | 2002/0038363 A1 | 3/2002 | MacLean |
| 6,728,397 B2 | 4/2004 | McNeal | | 2002/0046169 A1 | 4/2002 | Keresman, III et al. |
| D490,840 S | 6/2004 | Arakaki et al. | | 2002/0047316 A1 | 4/2002 | Chitayat |
| D491,186 S | 6/2004 | Arakaki et al. | | 2002/0052842 A1 | 5/2002 | Schuba et al. |
| D491,953 S | 6/2004 | Arakaki et al. | | 2002/0055907 A1 | 5/2002 | Pater et al. |
| D496,365 S | 9/2004 | Liu et al. | | 2002/0069134 A1 | 6/2002 | Solomon |
| D498,236 S | 11/2004 | Liu et al. | | 2002/0072976 A1 | 6/2002 | Virtanen et al. |
| 6,820,058 B2 | 11/2004 | Wood et al. | | 2002/0077978 A1 | 6/2002 | O'Leary et al. |
| 6,824,066 B2 | 11/2004 | Weyant | | 2002/0082985 A1 | 6/2002 | MacKay |
| 6,825,940 B1 | 11/2004 | Wu et al. | | 2002/0084321 A1 | 7/2002 | Martens et al. |
| 6,860,375 B2 | 3/2005 | Hallowell et al. | | 2002/0087415 A1 | 7/2002 | Allen et al. |
| 6,865,547 B1 | 3/2005 | Brake, Jr. et al. | | 2002/0087468 A1 | 7/2002 | Ganesan et al. |
| 6,942,569 B2 | 9/2005 | Petracca | | 2002/0087469 A1 | 7/2002 | Ganesan et al. |

| | | | | | | |
|---|---|---|---|---|---|---|
| 2002/0091635 A1 | 7/2002 | Dilip et al. | | 2005/0055254 A1 | 3/2005 | Schmidtberg et al. |
| 2002/0100803 A1 | 8/2002 | Sehr | | 2005/0077349 A1 | 4/2005 | Bonalle et al. |
| 2002/0107770 A1 | 8/2002 | Meyer et al. | | 2005/0086178 A1 | 4/2005 | Xie et al. |
| 2002/0107788 A1 | 8/2002 | Cunningham | | 2005/0091156 A1 | 4/2005 | Hailwood et al. |
| 2002/0111837 A1 | 8/2002 | Aupperle | | 2005/0097046 A1 | 5/2005 | Singfield |
| 2002/0128981 A1 | 9/2002 | Kawan et al. | | 2005/0097050 A1 | 5/2005 | Orcutt |
| 2002/0133461 A1 | 9/2002 | Ramachandran | | 2005/0114883 A1 | 5/2005 | Nagai et al. |
| 2002/0138390 A1 | 9/2002 | May | | 2005/0116024 A1 | 6/2005 | Beenau et al. |
| 2002/0138398 A1 | 9/2002 | Kalin et al. | | 2005/0144059 A1 | 6/2005 | Schuessler |
| 2002/0145039 A1 | 10/2002 | Carroll | | 2005/0167488 A1 | 8/2005 | Higgins et al. |
| 2002/0156723 A1 | 10/2002 | Lilly et al. | | 2005/0171898 A1 | 8/2005 | Bishop et al. |
| 2002/0169658 A1 | 11/2002 | Adler | | 2005/0177480 A1 | 8/2005 | Huang |
| 2002/0170966 A1 | 11/2002 | Hannigan et al. | | 2005/0179251 A1 | 8/2005 | Wagoner et al. |
| 2002/0178071 A1 | 11/2002 | Walker et al. | | 2005/0189427 A1 | 9/2005 | Brown et al. |
| 2002/0184151 A1 | 12/2002 | Maloney | | 2005/0209954 A1 | 9/2005 | Asher et al. |
| 2002/0194081 A1 | 12/2002 | Perkowski | | 2005/0216888 A1 | 9/2005 | Drummond et al. |
| 2002/0194096 A1 | 12/2002 | Falcone et al. | | 2005/0228751 A1 | 10/2005 | Keown et al. |
| 2002/0198817 A1 | 12/2002 | Dhir | | 2005/0261955 A1 | 11/2005 | Humble et al. |
| 2002/0199182 A1 | 12/2002 | Whitehead | | 2006/0036553 A1 | 2/2006 | Gupta et al. |
| 2003/0018557 A1 | 1/2003 | Gilbert et al. | | 2006/0039733 A1 | 2/2006 | Meyerhofer |
| 2003/0018567 A1 | 1/2003 | Flitcroft et al. | | 2006/0041540 A1 | 2/2006 | Shannon et al. |
| 2003/0028481 A1 | 2/2003 | Flitcroft et al. | | 2006/0106650 A1 | 5/2006 | Bush |
| 2003/0037002 A1 | 2/2003 | Higgins et al. | | 2006/0106717 A1 | 5/2006 | Randle et al. |
| 2003/0040927 A1 | 2/2003 | Sato et al. | | 2006/0136335 A1 | 6/2006 | Ferguson |
| 2003/0040959 A1 | 2/2003 | Fei et al. | | 2006/0161501 A1 | 7/2006 | Waserstein et al. |
| 2003/0046218 A1 | 3/2003 | Albanese et al. | | 2006/0167989 A1 | 7/2006 | Bashen et al. |
| 2003/0055675 A1 | 3/2003 | Twennaar | | 2006/0178986 A1 | 8/2006 | Giordano et al. |
| 2003/0061157 A1* | 3/2003 | Hirka et al. ............... 705/39 | | 2006/0206427 A1 | 9/2006 | Love et al. |
| 2003/0069780 A1 | 4/2003 | Hailwood et al. | | 2006/0213975 A1* | 9/2006 | Krishnan et al. ............. 235/380 |
| 2003/0097335 A1 | 5/2003 | Moskowitz et al. | | 2006/0259390 A1 | 11/2006 | Rosenberger |
| 2003/0100803 A1 | 5/2003 | Lu et al. | | 2006/0282389 A1 | 12/2006 | Gupte |
| 2003/0101131 A1 | 5/2003 | Warren | | 2006/0287953 A1 | 12/2006 | Chauhan |
| 2003/0105641 A1 | 6/2003 | Lewis | | 2007/0005498 A1 | 1/2007 | Cataline et al. |
| 2003/0110070 A1 | 6/2003 | DeGoeij | | 2007/0118470 A1 | 5/2007 | Vanderhorst |
| 2003/0110136 A1 | 6/2003 | Wells et al. | | 2007/0138255 A1 | 6/2007 | Carreon et al. |
| 2003/0110442 A1 | 6/2003 | Battle | | 2007/0265924 A1 | 11/2007 | Schwarz |
| 2003/0120686 A1 | 6/2003 | Kim et al. | | 2007/0288334 A1 | 12/2007 | Creedle et al. |
| 2003/0130945 A1 | 7/2003 | Force et al. | | 2008/0010202 A1 | 1/2008 | Schwarz |
| 2003/0130952 A1 | 7/2003 | Bell et al. | | 2008/0116283 A1 | 5/2008 | Newbrough et al. |
| 2003/0144942 A1 | 7/2003 | Sobek | | 2008/0193008 A1 | 8/2008 | Mount et al. |
| 2003/0187787 A1 | 10/2003 | Freund | | 2008/0277465 A1 | 11/2008 | Pletz et al. |
| 2003/0187789 A1 | 10/2003 | Karas et al. | | 2008/0288396 A1 | 11/2008 | Siggers |
| 2003/0191710 A1 | 10/2003 | Green et al. | | 2009/0043651 A1 | 2/2009 | Schwarz |
| 2003/0200107 A1 | 10/2003 | Allen et al. | | 2009/0265275 A1 | 10/2009 | Everhart |
| 2003/0208421 A1 | 11/2003 | Vicknair et al. | | 2010/0153199 A1 | 6/2010 | Ahmad |
| 2003/0208441 A1 | 11/2003 | Poplawski et al. | | | | |
| 2003/0213843 A1 | 11/2003 | Jackson | | | FOREIGN PATENT DOCUMENTS | |
| 2003/0217005 A1 | 11/2003 | Drummond et al. | | EP | 1014318 | 6/2000 |
| 2003/0217329 A1 | 11/2003 | Good | | JP | 2001-266039 | 9/2001 |
| 2003/0218066 A1 | 11/2003 | Fernandes et al. | | JP | 2002-24618 | 1/2002 |
| 2003/0225663 A1 | 12/2003 | Horan et al. | | JP | 2002-056063 | 2/2002 |
| 2003/0233305 A1 | 12/2003 | Solomon | | JP | 2002-083241 | 3/2002 |
| 2003/0237046 A1 | 12/2003 | Parker et al. | | JP | 2002-087536 | 3/2002 |
| 2004/0010465 A1 | 1/2004 | Michalski et al. | | JP | 2002-508547 | 3/2002 |
| 2004/0019605 A1 | 1/2004 | Keown et al. | | JP | 2002-140505 | 5/2002 |
| 2004/0029569 A1 | 2/2004 | Khan et al. | | WO | WO 91/16691 | 10/1991 |
| 2004/0049451 A1 | 3/2004 | Berardi | | WO | WO 93/08545 | 4/1993 |
| 2004/0049456 A1 | 3/2004 | Dreyer | | WO | WO 94/28497 | 12/1994 |
| 2004/0064409 A1 | 4/2004 | Kight et al. | | WO | WO 96/08783 | 3/1996 |
| 2004/0078328 A1 | 4/2004 | Talbert et al. | | WO | WO 96/12242 | 4/1996 |
| 2004/0094624 A1 | 5/2004 | Fernandes et al. | | WO | WO 97/14108 | 4/1997 |
| 2004/0133516 A1 | 7/2004 | Buchanan et al. | | WO | WO 97/45796 | 12/1997 |
| 2004/0149544 A1 | 8/2004 | Dal Ferro | | WO | WO 97/45814 | 12/1997 |
| 2004/0159700 A1 | 8/2004 | Khan et al. | | WO | WO 98/09260 | 3/1998 |
| 2004/0201735 A1 | 10/2004 | Baron | | WO | WO 99/10823 | 3/1999 |
| 2004/0210498 A1 | 10/2004 | Freund | | WO | WO 00/39979 | 7/2000 |
| 2004/0228514 A1 | 11/2004 | Houle et al. | | WO | WO 01/75730 A2 | 10/2001 |
| 2004/0232223 A1 | 11/2004 | Beenau et al. | | WO | WO 02-47022 | 6/2002 |
| 2004/0236688 A1 | 11/2004 | Bozeman | | WO | WO 02/063432 | 8/2002 |
| 2004/0239481 A1 | 12/2004 | Beenau | | WO | WO 2004-079603 | 9/2004 |
| 2004/0242308 A1 | 12/2004 | Gray | | | | |
| 2004/0252012 A1 | 12/2004 | Beenau et al. | | | OTHER PUBLICATIONS | |
| 2004/0254837 A1 | 12/2004 | Roshkoff | | | | |
| 2004/0260607 A1 | 12/2004 | Robbins et al. | | Annual Report Pursuant to Section 13 or 15(d) of the Securities Exchange Act of 1934, Form 10-K, Intelidata Technologies Corporation, Fiscal Year Ended Dec. 31, 2001. | | |
| 2005/0021466 A1 | 1/2005 | Buchanan et al. | | | | |
| 2005/0033619 A1 | 2/2005 | Barnes et al. | | | | |
| 2005/0033690 A1 | 2/2005 | Antognini et al. | | | | |
| 2005/0035847 A1 | 2/2005 | Bonalle et al. | | Block, Valerie, Blockbuster running test of a stored value card, The American Banker, Sep. 1, 1995. | | |
| 2005/0040242 A1 | 2/2005 | Beenau et al. | | | | |

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/ credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Armstrong, Douglas, Norwest eases difficulty of Interstate banking Bank's customers may use the same account number at any branch.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Maturi, Richard, Personal Finance; When you Need to Send Cash in a Flash.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, and Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

Terrie Miller and Henry Yan, When Custody Governs, Benefits Canada, Toronto, Feb. 1998, vol. 22, Issue 2, pg. 33, 5 pages.

Unknown, ABA Banking Journal; The front end and back end functions of item processing will benefit from the technological advances of imaging; Mar. 1990; acs01038997.

Arend, Mark; Bank applications fuel optical storage market; ABA Banking Journal; Oct. 1991; acs01039000.

Unknown, Alabama department of revenue selects Unisys for imaging solution to speed tax returns, save taxpayers money; Sep. 6, 1995; acs01039064.

Unknown, BancTec selects alchemy CD-Based archival solution for remittance processing system; May 6, 1998; acs01039047.

Keeton, Ann, Bank of America completes its rollout of 'paperless' processing of payments; Nov. 1, 1999; acs01039334.

Stanley, Susan et al., Bank of America provides nationwide image lockbox services; Oct. 20, 1999; acs01039405.

Business Wire; 1A Corp. wins contract with comerica to install the first digital all items archive, one of nation's top 25 bank holding companies expects to streamline operations . . . ; Jan. 9, 1997; acs01039033.

Business Wire; IA Corp. shows complex transaction processing software Work vision at AIIM, plus Check Vision and Remit Vision application frameworks for new advanced banking services . . . ; Apr. 14, 1997; acs01039025.

Business Wire; Shawnut bank provides lockbox customers real-time, on-line electronic exception processing, 1A Corp's image-based lockbox system cuts processing time from days to minutes . . . ; Jan. 9, 1996; acs01039031.

Unknown, Business Wire; State of Minnesota using At&T imaging solution . . . ; Apr. 18, 1994; acs01039027.

Unknown, Caere introduces the Model 1800 document remittance processor; compact unit provides cost effective means for low to medium speed document processing; Oct. 19, 1995; acs01039057.

Malyykhina, Elena, Cell Phone Software Formats Checks for Online Banking.

Lupo, Lisa Selkin, Chase image-enables NY wholesale lockbox facility with VICOR technology; Aug. 31, 1999; acs01039406.

Anonymous, Chase offers image lockbox for Europe; Aug. 1997; acs01039336.

Unknown, Crestar to introduce new advanced cash management system based on IA Corp. software; New system will be industry's first, . . . ; Oct. 28, 1996; acs01039059.

Unknown, DMP and IMR Partner to develop electronic archiving solution for wholesale Lockboxes and remittance processing; Mar. 24, 1998; acs01039040.

Matyas, Stephen M., Digital Signatures—An Overview; pp. 87-94; 1979.

Friis, M. William; Goodbye to paper?; ABA Banking Journal, Mar. 1989; acs01037874.

Unknown, IA Corp. announces new CheckVision products; new CheckVision archive software supports short; Apr. 1, 1996; acs01039339.

Unknown, IA Corporation becomes a major player in image-based cash management solutions; Nov. 24, 1995; acs01039052.

Unknown, IA announces installation at QuestPoint of first client/server cash management system with check image storage compatible with IBM, NCR and Unisys; May 29, 1997; acs01039044.

Unknown, IA presents new advanced cash management software at TMA to link banks and their corporate customers; full suite of cash management products allow banks to offer treasury . . . ; Nov. 18, 1996; acs01039049.

Unknown, IA's remit vision adopted by Harris Bank for CD-ROM and online customer viewing of check and remittance documents; continues banking industry trends to use image-based processing as strategic weapon . . . ; May 28, 1996; acs01039042.

IEM Product Description; ACS01066106.

Fitch, Thomas P., Image technology brings lockbox breakthroughs; Sep. 1995; acs01039344.

Andersen Consulting, Image-based transaction processing; The banking industry's challenge for the 1990s and beyond; 1989; acs01039270.

Tauhert, Christy, Lock box solutions reengineer payments; Aug. 1996; acs01039337.

Mead, Wendy S.; Two Banks' Imaging Deals Target Fee Revenue Increases; The American Banker; May 9, 1997; acs01039019.

Moyer, Liz; Bank of Montreal to Install Imaging System by Unisys for Retail Lockbox Services; The American Banker; Oct. 22, 1996; acs01039023.

Moyer, Liz; KeyCorp joins trend to check imaging for lockbox; The American Banker; Aug. 23, 1996; acs01039004.

Unknown, NCR introduces 7780 item processing system; image-based system scans and reads documents; Mar. 11, 1992; acs01039038.

Marjanovic, Steven, NationsBank offers lockbox imaging; Jul. 3, 1995; acs01039350.

Unknown, NationsBank rolls out first wholesale lockbox imaging; Aug. 3, 1995; acs01039351.

Shannon, John, New lockbox platform due out at NationsBank; Feb. 1998; acs01039384.

Price, Joanne et al, U.S. Appl. No. 60/133,577, entitled Doculink Imaging System, May 11, 1999.

Buckley, JP et al., Processing Noisy Structured Textual Data Using a Fuzzy Matching Approach Application to Postal Address Errors; XP-001132075; pp. 195-205 (11 pages); Dec. 2000.

Schutzer, Daniel; Get ready for electronic commerce; ABA Banking Journal; Jun. 1995; acs01038994.

Jensen, Cindy, U.S. Bank effectively manages complexity; May/Jun. 2006; acs01039402.

Jensen, Cindy, U.S. bank effectively manages complexity; acs01039398.

Jensen, Cindy, U.S. bank effectively manages complexity; acs01039400.

Unknown, Wholesale lockbox imaging; Feb. 1, 1993; acs01039331.

* cited by examiner

SYSTEM AND METHOD FOR PROCESSING TRANSACTIONS USING A MULTI-ACCOUNT TRANSACTIONS DEVICE

RELATED APPLICATIONS

This patent application is a Continuation of U.S. patent application Ser. No. 11/968,018, filed Dec. 31, 2007 entitled "SYSTEM AND METHOD FOR PROCESSING TRANSACTIONS USING A MULTI-ACCOUNT TRANSACTIONS DEVICE", the disclosure of which is hereby incorporated by reference in its entirety.

FIELD OF THE INVENTION

The present invention relates to systems and methods for processing transactions using a multi-account transactions device. More particularly, the present invention relates to systems and methods that enable customers of a financial institution, for example, to selectively determine which account(s) are to be used for a given transaction, wherein such selection may occur before or after the transaction has been processed and posted to a particular account(s).

BACKGROUND

Many point-of-sale and other financial transactions take place using card transactions. In these transactions, to provide payment a card user typically presents a credit card, a bank, debit or automated teller machine (ATM) card, or possibly a stored value card. The cards presented are conventionally of one and only one of these types. The cards presented typically access only a single account.

For example, a user may present a credit card to pay from a credit account maintained by the issuer of the card. The credit card is typically embossed with a unique account number, the cardholder's name, and the expiration date of the card. Data is also encoded on a magnetic stripe on the card. The data identifies the cardholder's account and may be accessed by magnetic card readers connected to a credit card processing system.

An ATM card is used in similar manner. The ATM card is a plastic card that is typically embossed with an account number and the holder's name. The ATM card also includes data encoded on a magnetic stripe of the card. The data identifies the cardholder's account and may be accessed by a magnetic card reader to use the card.

A stored value card is typically used to pay for a specific product or service. The stored value card includes data regarding a limited use account that is limited to providing payment for a specific product or service or for products and services at a specific merchant. The data permits processing equipment at the point of sale to determine the value of funds in the account.

In a typical card payment transaction, for example a credit card transaction, a buyer presents a credit card to a merchant at the point of sale. The apparatus at the point of sale reads account information from the card and passes this information along through a chain of processors where approval is obtained and the transaction posted and charged to the customer's account. The card holder's credit account balance is increased by an amount equal to the amount of the transaction. A similar process occurs for debit or stored value card transactions, except of course the transaction amount is immediately deducted from the card holder's account that is associated with the debit or stored value card.

Typically, once a transaction has been charged and posted to a particular account, the card holder must make payment on the account in order to clear the balance. For debit and stored value transactions this occurs immediately, whereas for credit transactions interest may accrue on outstanding balances until such time as full payment is made. In either case, current systems and methods do not permit the card holder to selectively transfer some or all of the outstanding balances in a given account, such as a credit account, for example, to another account, such as a debit account, for example, on a transaction by transaction basis to achieve a benefit, obtain a reward or better organize and administer the card holder's transactions and payments.

SUMMARY OF THE INVENTION

According to various embodiments, the systems and methods described herein may, among other things, allow a customer of a financial institution, for example, to enter into purchase transactions with a single card or other device and selectively determine which account(s) the transaction is to be applied to. In some embodiments, customers may control transaction spending and payments by allocating purchases to particular account(s) at the point-of-sale (POS), then selectively reallocating some or all of the transaction amounts to other account(s) on an ongoing and as needed basis. In some embodiments, the systems and methods described herein may allow card holders, for example, to allocate purchases when and where they spend into meaningful categories of their choosing. For example, select transactions can be paid immediately (e.g., through a debit account), while other transactions are paid at the end of the month (e.g., processed at the POS through a credit account).

For example, a customer may have three accounts: (1) a business account, (2) a personal or home account, and (3) an entertainment account. For each given transaction the customer enters into, the appropriate account(s) may be selected, either by the customer at the POS (e.g., the customer swipes a corresponding card, magnetic stripe or initiates another account identifier corresponding to the desired account(s)), or according to rules and parameters that may have been predetermined by the card holder, merchant, financial institution, or any other individual or entity that may be involved in the processing of customer transactions). In some embodiments, more than one account may be selected. Once accounts are selected, the transaction amount is processed and posted accordingly. In some embodiments, the accounts and/or applications associated with a particular card or device are all maintained by a single financial institution, such as a bank, for example. In some embodiments, the accounts and/or applications associated with a particular card or device are all maintained by any number of financial institutions.

After the transaction has been processed and/or posted, the customer may selectively reallocate some or all of a transaction amount, for example, to another account(s). For example, if the purchase of a $100.00 fax machine was initially charged to the card holder's personal or home account, the various systems and methods described herein may permit the card holder, for example, to select another account (e.g., the business account) to which some or all of the $100.00 should be transferred to. In some embodiments, the card holder may make the selection upon realizing the expense relates to his business and therefore should be transferred to the corresponding account(s). In some embodiments, the card holder may request transfer after the transaction amount has been processed an posted to an initial account. In some embodiments, the transfer request to the business account may be initiated by rules or parameters that direct transfer to particular accounts based on particulars of the transactions, such as, for example, the transaction date, transaction amount, merchant, product or service purchased, or any other data or information that may relate to a given transactions.

In some embodiments, account selection may be processed on an item-by-item basis, such as, for example, on the basis of the particular product(s) or service(s) purchased. For example, if a customer purchases clothing, electronic audio equipment and office supplies at a particular retailer, the systems and methods described herein may select an appropriate account(s) to which the transactions should be processed based on the identity of the retailer, while in some embodiments account(s) may be selected on an item-by-item basis. Thus, the clothing portion of the transaction may be assigned to the personal or home account, the electronic audio equipment may be assigned to the entertainment account, and the office supplies may be assigned to the business account. In some embodiments, account selection may be made by the card holder or other individual or entity with knowledge of the transaction amounts for each item purchased, while in some embodiments account(s) are selected based on transaction data or information that may be used to identify particular items or services purchased, such as for example, the SKU or other identifier.

In some embodiments, the various systems and methods described herein may incorporate a physical device (e.g., card, RFID, biometric, or other identifier) that enables a customer to selectively determine which account(s) a transaction is to be posted to. In some embodiments, the physical device may comprise portions that are interconnected by a hinge such that the two portions can fold upon themselves. In some embodiments, the device may include a closing mechanism that can keep the two portions of the device in a closed (e.g., a locked) position. In some embodiments, the thickness of the closed card is similar to current cards (e.g., each portion of the card is half as thick as current cards). In some embodiments, each portion of the device may have multiple account identifiers (e.g., magnetic stripes) on either side, for example, that can be initiated to designate the corresponding account(s). For example, a card holder or merchant may initiate (e.g., swipe a magnetic stripe) at least one account identifier to designate at least one account to which the transaction should be posted.

In some embodiments, metallic substrates may be used to shield cards and expose only one stripe at a time. In some embodiments, an interface may allow the consumer to color-code cards or account identifiers, enabling one to be for social transactions and the other for business purposes, for example. Alternatively, one could be credit and the other debit. Cards may also be customized to a particular card holder's needs and preferences.

In some embodiments, particular cards may have sub-categories associated with it. For example, a card or device may have associated with the following types or categories of accounts: personal, business expense, small business, fuel/transportation, charity, entertainment, food, children, or any other type or category of account that a user may designate or desire to utilize and implement. The designation of categories may of course change as the user's needs evolve. In some embodiments, thresholds can be established for particular cards. For example, the user may specify that an account devoted to entertainment be capped at a certain threshold so that the user may control frivolous or non-essential spending. A transaction may be declined if it goes beyond the threshold. In some embodiments, a user may be alerted when a set threshold is being approached. In some embodiments, a user may be recognized for complying with or staying within predetermined thresholds. For example, a user may be rewarded with discounts or other incentives or promotions for not surpassing the thresholds. Other limitations may of course be imposed, such as, for example, date/time parameters on when certain accounts may be used, merchants where accounts may be used at, and the types of products or services that can be purchased with certain accounts. Other parameters are of course possible.

In some embodiments, the systems and methods described herein may provide certain attributes as well as alerts or notifications to a user. For example, in some embodiments, the various systems and methods described herein may contain the following alert/notifications or attributes: (1) ability to set personal allowances that trigger status alerts on the go; (2) ability to compare spending patterns over time; (3) beat your best—a feature that brings a playful tone to self check-ins (you vs. you); (4) ability to benchmark you vs. (aspirational others); (5) metrics for gauging progress; and (6) ability to choose between debit or credit (pay now vs. pay later).

According to one embodiment of the systems and methods described herein, a method for processing transactions using a multi-account transaction device is provided. The method comprising the steps of: receiving at least one transaction particular relating to a transaction conducted with a multi-account transaction device; determining at least one first desired account associated with the multi-account transaction device to which the transaction will be posted; posting the transaction to the at least one first desired account; receiving at least one second desired account to which at least a portion of the transaction should be posted; posting the at least a portion of the transaction to the at least one second desired account; and reconciling the at least one first desired account.

In some embodiments, a card or device associated with any number of accounts may be utilized by any number of users. For example, any member of a family, organization, association, company or other group or entity, for example, may utilize a card or device and designate accounts as described herein. In some embodiments, a user may associate a particular transaction with any number of accounts, and may switch all or any portion of a transaction(s) to any number of accounts after the transaction(s) has been processed or posted.

In another embodiment of the systems and methods described herein, a system for processing transactions a multi-account transaction device is provided. The system comprising a transactions processor or module for receiving at least one transaction particular relating to a transaction conducted with a multi-account transaction device; an account determination processor or module for determining at least one first desired account associated with the multi-account transaction device to which the transaction will be posted; an account posting processor or module for posting the transaction to the at least one first desired account; a post-transaction account determination processor or module for receiving at least one second desired account to which at least a portion of the transaction should be posted; and a reconciliation processor or module for reconciling the at least one first desired account.

In still another embodiments of the systems and methods described herein, a multi-account transaction device is provided. The multi-account transaction device comprising a top portion having at least one top portion identifier associated with at least one account; a bottom portion having at least one bottom portion identifier associated with at least one account; a hinge connecting the top portion to the bottom portion, wherein the top and second portions are relatively movable between a first position where a first amount of account identifiers are available to a second position where a second amount of account identifiers are available for initiation; wherein the at least one top portion identifier or the at least one bottom portion identifier may be initiated at a point-of-sale terminal to designate at least one account to which a transaction amount is to be posted; and wherein the transaction account posted to the at least one account may be subsequently transferred to at least one other account.

Other embodiments may also be considered.

DETAILED DESCRIPTION OF EXEMPLARY EMBODIMENTS

Figure 1:
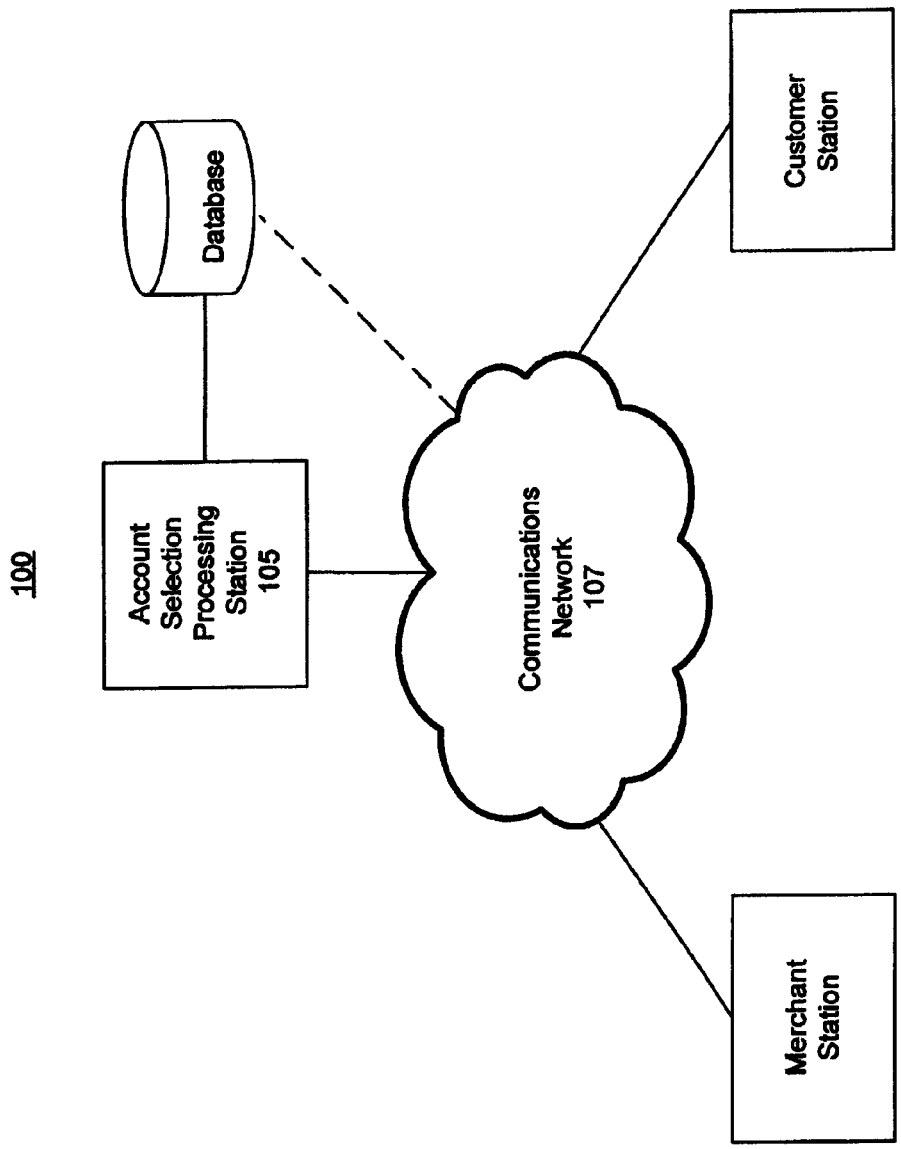
FIG. 1 shows an exemplary system 100 for processing transactions, according to various embodiments of the invention.

Reference will now be made to the present preferred embodiments of the invention, examples of which are illustrated in the accompanying drawings in which like reference characters refer to corresponding elements.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Among many potential uses, the systems and methods described herein may be used to: (1) induce customer loyalty by providing flexible payment and account selection options; (2) allow customers to make purchases and enter into transactions using a single financial instrument and selectively determine which account(s) a particular transaction should be posted to; (3) allow merchants, banks, financial service providers, instrument issuers or other entity a system and method for dynamically selecting account(s) to which a customer's transactions should be posted based on, for example, predetermined rules or parameters; (4) allow card holders, for example, the ability to change their minds on which accounts a particular transaction should be posted to, even after the transaction has already been posted to an account; (5) allow card holders, for example, the ability to predetermine rules or parameters setting forth to which accounts particular transactions should be posted to; (6) allow card holders, for example, to selectively designate portions of a transaction (e.g., transaction amount) to select account(s); (7) provide a user with relevant alerts and notifications. Other uses are possible.

FIG. 1 illustrates a system 100 for processing transactions, according to one embodiment of the invention. System 100 may comprise a account selection processing station 105 for processing transactions associated with any number of account(s). In some embodiments, transactions may be posted to accounts based upon direction of a customer or another or dynamically based on any data or information that may readily be used to determine appropriate accounts to which a transaction should be posted to. In some embodiments, account selection processing station 105 may be administered by a bank or other financial institution that issues and administers transaction devices, such as cards, for example, (e.g., a card-issuer), a merchant or vendor that sponsors or accepts transaction devices (e.g., a sponsor), or any individual, entity or third party that accepts, coordinates, manages or administers customer use of transaction devices or other instruments to conduct transactions. In some embodiments, account selection processing station 105 may maintain or have access to particulars about customers, transaction particulars, transaction histories, account balances, merchants, and any data and information that may be used to selectively determine particular accounts to which a transaction should be posted to, according to the systems and methods described herein. In some embodiments, account selection processing station 105 may comprise a central headquarters or distributed network or repository of the various features and functions of the systems and methods described herein, and may be maintained by or in conjunction with any party or entity that administers the coordination of data and information in connection with the processing of transactions according to the systems and methods described herein.

Account selection processing station 105 may comprise a single server or engine (as shown). In another embodiment, account selection processing station 105 may comprise a plurality of servers or engines, dedicated or otherwise, which may further host modules for performing desired system functionality. Account selection processing station 105, for example, may host one or more applications or modules that function to permit interaction between the users of system 100 (e.g., card holders, customers, merchants, the administrator of account selection processing station 105, and any other relevant parties) as it relates to exchanging and processing of data and information related to the processing of transactions and the selection of accounts as described herein, for example. For instance, account selection processing station 105 may include an administration module that serves to permit interaction between the system 100 and the individual(s) or entity(ies) charged with administering system 100 or account selection processing station 105. Such an administration module may enable the agent of account selection processing station 105, for example, to input information related to transaction types, account categories, customer information, including but not limited to rules and parameters used to determine which accounts a particular transaction should be posted to. Such rules and parameters may comprise variables that define, for example, a particular type or pool of transactions that are eligible to be processed by a particular account or accounts. Thus, if a customer spends a certain amount on purchases relating to business or office equipment, the transaction amount may be processed by and posted to an account designated for business or office expenses. Other examples are of course possible.

According to various embodiments, an agent of account selection processing station 105 may interface with a graphical user interface (or GUI) to input, among other things: (1) data or information (e.g., terms, words, phrases, or digits) that enable the systems and methods described herein to process transactions and designate accounts to which transactions should be posted, (2) data or information that enable the systems and methods described herein to receive card holder designations that specify accounts to which a transaction should be posted or to which a balance should be transferred, (4) data or information that enable the systems and methods described herein to process transaction information provided by merchants which relate to a customer specific purchases; and (5) rules, parameters and algorithms used to determine the processing and posting of transactions to particular accounts. An agent of account selection processing station 105 may also input information or data regarding how customers, transactions, transactions devices, accounts, products or services, or any other data or information used by the systems and methods described herein are stored (e.g., categorized) in a database 112, for example. Other modules may permit processing of the various features and functionality described herein for processing transactions (See FIG. 2 for modules associated with account selection processing station 105).

Account selection processing station 105 may include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Data and information maintained by account selection processing station 105 may be stored and cataloged in database 112 which may comprise or interface with a searchable database. Database 112 may comprise, include or interface to a relational database. Other databases, such as a query format database, a Standard Query Language (SQL) format database, a storage area network (SAN), or another similar data storage device, query format, platform or resource may be used. Database 112 may comprise a single database or a collection of databases, dedicated or otherwise. In one embodiment, database 112 may store or cooperate with other databases to store the various data and information described herein. In some embodiments, database 112 may comprise a file management system, program or application for storing and maintaining data and information used or generated by the various features and functions of the systems and methods described herein. In some embodiments, database 112 may store, maintain and permit access to customer information, transaction information, account information, and general information used to process transactions as described herein. In some embodiments, database 112 is connected directly to account selection processing station 105, which, in some embodiments, it is accessible through a network, such as communication network 107, for example.

Account selection processing station 105 may, in some embodiments, be accessed via a communication network 107. Communications network 107 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network 107 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 107 may comprise a satellite communications network, such as a direct broadcast communication system (DBS) having the requisite number of dishes, satellites and transmitter/receiver boxes, for example. Communications network 107 may also comprise a telephone communications network, such as the Public Switched Telephone Network (PSTN). In another embodiment, communication network 120 may comprise a Personal Branch Exchange (PBX), which may further connect to the PSTN.

As shown in FIG. 1, merchant station 110 and customer station 115 may communicate with account selection processing station 105 via communication network 107. Merchant station 110 may comprise, for example, a station utilized by an agent of a merchant to interact or communicate with its customers or account selection processing station 105. For example, merchant station 110 may comprise a call center facility or station of a card issuer or sponsor that is manned by an operator to receive calls from card members. In some embodiments, merchant station 110 may comprise a point-of-sale system or engine that processes merchant transactions with a customer and which may further cooperate or interact with external systems which carry out card and other transactions (e.g., credit card transactions), including without limitation, for example, account selection processing station 105. In some embodiments, merchant station 110 may comprise or host web sites or web pages of a merchant that the merchant's customers may access to interact with the merchant, such as to make purchases and inquiries.

Customer station 115 may, in some embodiments, enable a customer of a merchant, a holder of a transactions device, or any other person or entity that may utilize the systems and methods described herein to inquire about or purchase products, services or subscribe to or enroll in a transactions device (collectively, "customer") to interact and communicate with a merchant as represented by merchant station 110, for example, or with account selection processing station 105 in connection with the various features and functionality described herein. For example, customer station 115 may enable a customer to call or access the web site or page of a merchant, for example, to browse and possibly purchase a product, or to communicate with account selection processing station 105, such as by transmitting a desired account(s) designation that may be used to generate allocate transaction particulars as described herein, for example.

In some embodiments, customer station 115 may comprise any terminal (e.g., a typical home or personal computer system, telephone, personal digital assistant (PDA) or other like device) whereby a customer may interact with a network, such as communications network 107, for example, that is responsible for transmitting and delivering data and information used by the various systems and methods described herein. Customer station 115 may comprise or include, for instance, a personal or laptop computer, a telephone, or PDA. Customer station 115 may include a microprocessor, a microcontroller or other general or special purpose device operating under programmed control. Customer station 115 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Customer station 115 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Customer station 115 may also include a network-enabled appliance, a browser-equipped or other network-enabled cellular telephone, or another TCP/IP client or other device.

Figure 2:
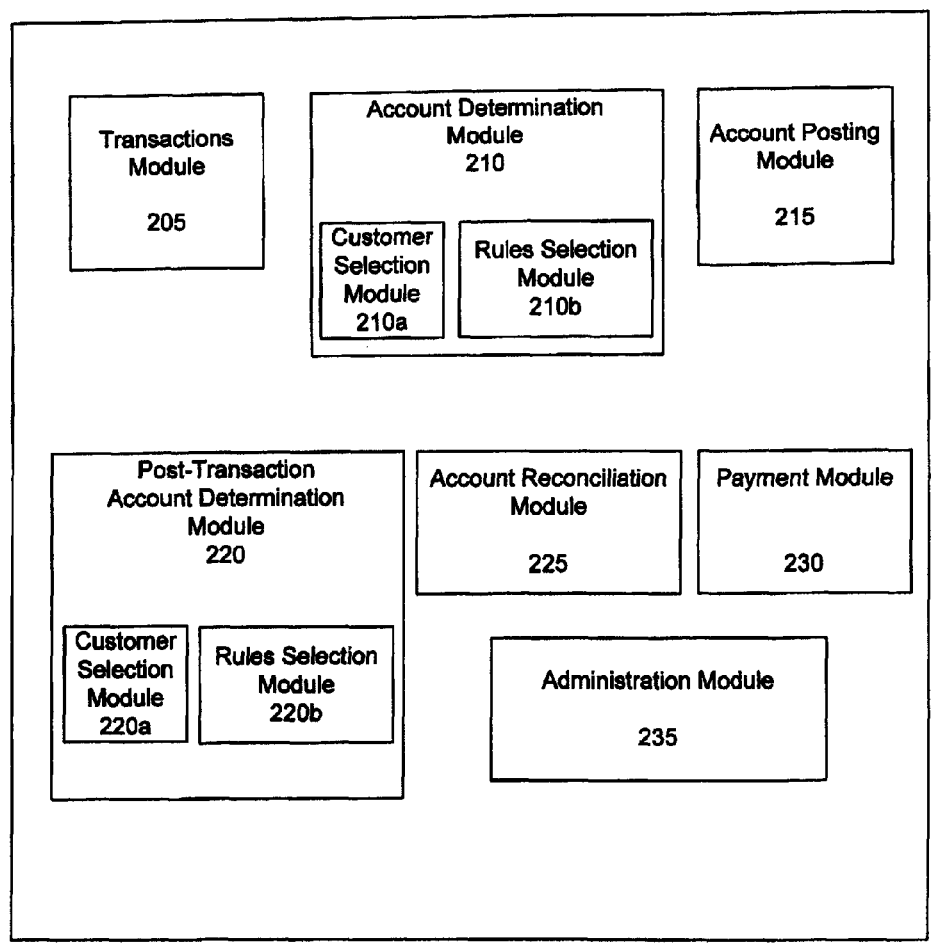
FIG. 2 illustrates various exemplary modules that may be associated with account selection processing station 105, according to various embodiments of the invention.

FIG. 2 illustrates exemplary modules that may be associated with account selection processing station 105 for carrying out (or administering) the various functions and features of the embodiments described herein. Other features and functionality are of course possible. While the modules may not be used in all embodiments to perform some or all of the functions of the present invention, they are nonetheless presented as possible embodiments:

Transactions module 205 may, in some embodiments, receive transaction data and information from particular merchants through which customers are making purchases or otherwise entering into transactions, such as, for example, through a transactions device as described herein. For example, transactions module 205 may cooperate or interact with a merchant system and/or a card processing system to receive particulars on transactions, such as date of transaction, name of merchant, cost of transaction, product or service purchased or sold (e.g., via a SKU, UPC or other identifier), or any other data or information that may relate to a transaction. The data and information received through transactions module 205 may be referenced or accessed by the various systems and methods described herein (including the other modules in FIG. 2) to carry out the features and functionality set forth herein, such as, for example, determining which account(s) a transaction or its particulars should be posted to.

Account determination module 210 may, in some embodiments, determine particular account(s) to which a transaction or its particulars should be posted. In some embodiments, account determination module 210 may permit account determination to be made by a customer or dynamically based on transaction data or information received from transaction module 205, for example, in both cases at the time of the transaction or thereafter. Thus, customer selection module 210a may, in some embodiments, receive customer designations that indicate at least one account to which a particular transaction or its particulars should be posted to. For example, a customer at a merchant's location may—before, during or after the transaction is entered into (e.g., a card is swiped, an RFID is read/initiated, typed in at POS, speak it, at self-checkout, or any other activity that results in execution of a transaction occurs)—transmit data or information that specifies at least one account to which the transaction or parts of the transaction should be posted. In some embodiments, rule selection module 210b may dynamically designate such account designations based upon predetermined rules or parameters, transaction history or the customer account-designation history. Thus, a customer may designate account designation preferences that are stored and referred to whenever a transaction occurs. For example, a customer may designate that accounts be designated based on any particular of a transaction, such as, for example, merchant name, date/time of transaction, transaction amount, product or service purchased, or any other data or information that may be used to designate accounts. In some embodiments, accounts may be dynamically selected based on demonstrated customer designation habits or history. Thus, if a customer's purchases at a particular establishment during a weekday are always charged to a particular account or account(s), the system and methods described herein may dynamically post future such transactions to those account(s).

In some embodiments, particular cards may have sub-categories associated with it. For example, a card or device may have associated with the following types or categories of accounts: personal, business expense, small business, fuel/transportation, charity, entertainment, food, children, or any other type or category of account that a user may designate or desire to utilize and implement. The designation of categories may of course change as the user's needs evolve. In some embodiments, thresholds can be established for particular cards. For example, the user may specify that an account devoted to entertainment be capped at a certain threshold so that the user may control frivolous or non-essential spending. A transaction may be declined if it goes beyond the threshold. In some embodiments, a user may be alerted when a set threshold is being approached. In some embodiments, a user may be recognized for complying with or staying within predetermined thresholds. For example, a user may be rewarded with discounts or other incentives or promotions for not surpassing the thresholds. Other limitations may of course be imposed, such as, for example, date/time parameters on when certain accounts may be used, merchants where accounts may be used at, and the types of products or services that can be purchased with certain accounts. Other parameters are of course possible.

In some embodiments, the systems and methods described herein may provide certain attributes as well as alerts or notifications to a user. For example, in some embodiments, the various systems and methods described herein may contain the following alert/notifications or attributes: (1) ability to set personal allowances that trigger status alerts on the go; (2) ability to compare spending patterns over time; (3) beat your best—a feature that brings a playful tone to self check-ins (you vs. you); (4) ability to benchmark you vs. (aspirational others); (5) metrics for gauging progress; and (6) ability to choose between debit or credit (pay now vs. pay later). The alert/notification feature of the systems and methods claimed herein may be performed by any of the various modules described herein.

Account posting module 215 may, in some embodiments, post transaction or parts of transactions to designated accounts. For example, account posting module 215 may interact or cooperate with the external systems of a bank or other entity that administers accounts, for example, to ensure that transactions or parts of transactions are posted to the proper accounts. In some embodiments, account posting module 215 may interact or cooperate with account determination module 210 or post-transaction account determination module 220 to receive customer or dynamically designated account selections.

Post-transaction account determination module 220 may, in some embodiments, receive and process account designations after a transaction or part of a transaction has been posted to an account. For example, a week after a transaction has been posted to a customer's credit account, for example, the customer may decide to transfer the balance from his credit account to his debit account for immediate payment. The customer may request the transfer by interacting with customer selection module 220a via client station 115 or other access means. In some embodiments, the customer may interact with a graphical user interface of account selection processing station 105 that enables the customer to selectively designate accounts after a transaction has occurred and been posted to at least one account. In some embodiments, post-transaction designations may be made by communicating with a customer service representative of station 105, or by making designations on the customer monthly account statement and returning such marked-up statement to the administrator of station 105 or agent thereof. In some embodiments, post-transaction designations may be made dynamically via rule selection module 220b, based on, for example, any particular of a transaction, such as, for example, merchant name, date/time of transaction, transaction amount, product or service purchased, or any other data or information that may be used to designate accounts.

In some embodiments, post-transaction designations may be made according to rules or parameters. For example, if an account balance has remained in a given account for a long period of time, the systems and methods described herein may prompt or query the account holder whether the balance needs to be moved to another account, such as, for example, a debit account where payment may be made immediately. Alternatively, funds from an account may be moved to another account to pay off a balance. Similarly, if a transaction with a given merchant remains in an account for period of time without payment being made, the various systems and methods described herein may remind the user of the outstanding balance and propose a payment schedule.

Account reconciliation module 225 may, in some embodiments, reconcile accounts based on account selections and designations. Thus, if a customer transfers some or all of a balance from his credit account to his debit account, account reconciliation module 225 may ensure that the proper balances are reflected in the two accounts after the transfer is effected. In some embodiments, account reconciliation module 225 may interact or cooperate with account posting module 215 (or external systems of account administrators, for example) in performing account reconciliation features and functionality.

Payment processing module 225 may, in some embodiments, receive and process payments from a customer, such as, for example, user of the transactions device. For example, the user of the device may make payment on any balances that have accrued on transactions conducted with the device. Such payments may be made on a periodic basis, such as daily, weekly, or monthly, for example. In addition, such payments may comprise a minimum payment towards the balance or the entire amount due and owing. In some embodiments, payment processing module 225 may interact or cooperate with external payment processors associated with a bank or other individual or entity that administers accounts to which payments are posted as described herein.

Administration module 235 may, in some embodiments, enable an administrator of account selection processing station 105, for example, to interact with the various modules, features and functionality described herein. For example, an agent of account selection processing station 105 may interact with administration module 235 to input, revise and remove data and information used by the various systems and methods described herein, such as, for example, customer information, benefit or reward information, transaction history information, merchant information, or any other data or information that may be used to perform the various features and functionality described herein. In some embodiments, administration module 235 may enable an administrator of account selection processing station 105 to establish parameters or rules associated with the various features and functionality described herein. For example, an administrator may establish limits, caps, delays, rules or fees associated with a customer's use of the features and functionality described herein. A customer may also be required to pay a fee to be able to be able to process transactions and select accounts as described herein. Such a fee may be, for example, annually or monthly imposed or may be charged on a one-time or per-transaction basis. In some embodiments, the fee may comprise a monetary amount or any other form of measurable value.

Figure 3:
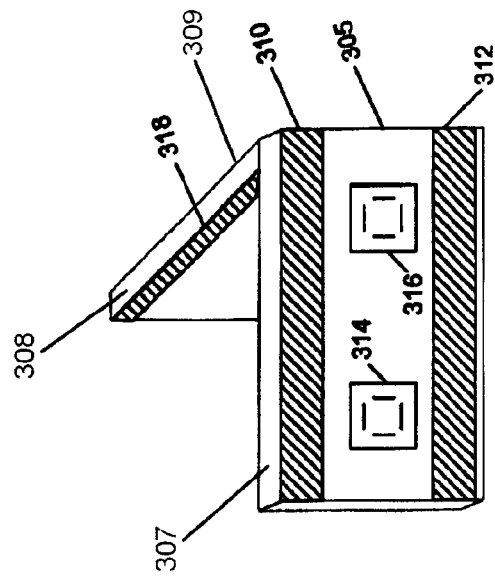
FIG. 3 illustrates an multi-account transaction device, according to various embodiments of the invention.

FIG. 3 illustrates a transactions device 305 for processing transactions and selecting accounts to which particular transactions are to be posted, according to an embodiment of the systems and methods described herein. As shown, a transactions device 305 is associated with account identifiers 310, 312, 314, 316, and 318, each of which may correspond to or be associated a particular account or accounts. In some embodiments, transactions device 305 may comprise a card (e.g., credit card, debit card, or stored value card), RFID, biometric, instrument, identifier or other characteristic or item that may be used by a user or another to conduct transactions. In some embodiments, transactions device 305 may be issued to a customer by a financial institution (e.g., a bank), a merchant, an administrator of station 105 or system 100, a sponsor of the device, or any other individual or entity. As shown, device 305 may comprise a top portion 307 and a bottom portion 308 that are connected together via a hinge element 309. The top and bottom portions may be selectively positioned so that desired account identifiers are exposed and available for initiation. Thus, if the bottom portion is completely closed against the top portion, account identifier 318 (e.g., the magnetic stripe) would not be exposed and therefore would not be available for the customer to swipe at a point-of-sale and initiate a transaction. Alternatively, if device is open, the customer will be able to access a greater number of accounts through account identifiers 312-318, for example. In some embodiments, device 305 may include a lock (not shown) that operates to lock the two portions of the device 305 in a closed position. In some embodiments, the total width of the device 305 in a closed position is equivalent to current or traditional cards, such as credit, debit, ATM or other like cards or devices.

The types of accounts accessible by via device 305 may comprise, for example, a line of credit account, checking account, money market account, debit account, savings account, or any other account that may be used to enter into transactions. In some embodiments, a user of device 305 may initiate any number of accounts associated with device 305 for use in a given transaction, either at the time of the transaction or thereafter. As shown in FIG. 3 account 310 is a dedicated gasoline account; account 312 is a dedicated groceries account; account 314 is a dedicated entertainment account; account 316 is a dedicated business account; and account 318 is a miscellaneous account. In some embodiments, which account(s) are used for a given transaction may depend on which account(s) the customer specifically designates at the POS, such as, for example, which one the customer initiates through a POS of sale device or identifies to the merchant representative. In some embodiments, account(s) may be selected based on particular rules or parameters that determine which accounts are applicable. For example, as shown in FIG. 3, account 310 may be initiated based on the merchant identity; account 312 on the basis of merchant or product identity; account 314 on the basis of merchant identity or date/time of transaction; account 316 on the basis of merchant or product identity or date/time of transaction; and account 318 only if another appropriate account cannot be determined. For example, if a given transaction occurred at an Amoco™ gas station, for example, the user's account 310 may be designated as the appropriate account based in the name of the merchant. In some embodiments, account determination may occur at the time of the transaction, such as, for example, after the an account identifier is initiated or identified. Thus, if the customer approaches the gas station attendant to pay for the transaction and initiates account 314, the various systems and methods may dynamically override the customer's selection (or prompt the customer for clarification or to confirm the selection) and post the transaction to the account 310 which is dedicated to gasoline transactions.

In some embodiments, a device 305 may have only one account identifier (e.g., only one magnetic stripe) through which all transactions are initiated. Thus, once a transaction is entered into (e.g., once the magnetic stripe is swiped through a POS device or account number or card provided to the merchant representative), the various systems and methods described herein may identify the appropriate accounts to which the transaction should be posted. For example, upon receiving transaction data and information relating to a customer's transactions over a period of time, account selection processing station 105 may process the data and information and allocate transactions or portions of transactions according to rules or parameters corresponding to the particular customer, such as those set forth in FIG. 3, for example. In some embodiments, the rules or parameters may be predetermined, established by the customer, a merchant(s), an administrator of the systems and methods described herein, an issuer or sponsor of device 305, for example, or any other individual or entity that may specify or define particular account selection rules or parameters.

Figure 4:
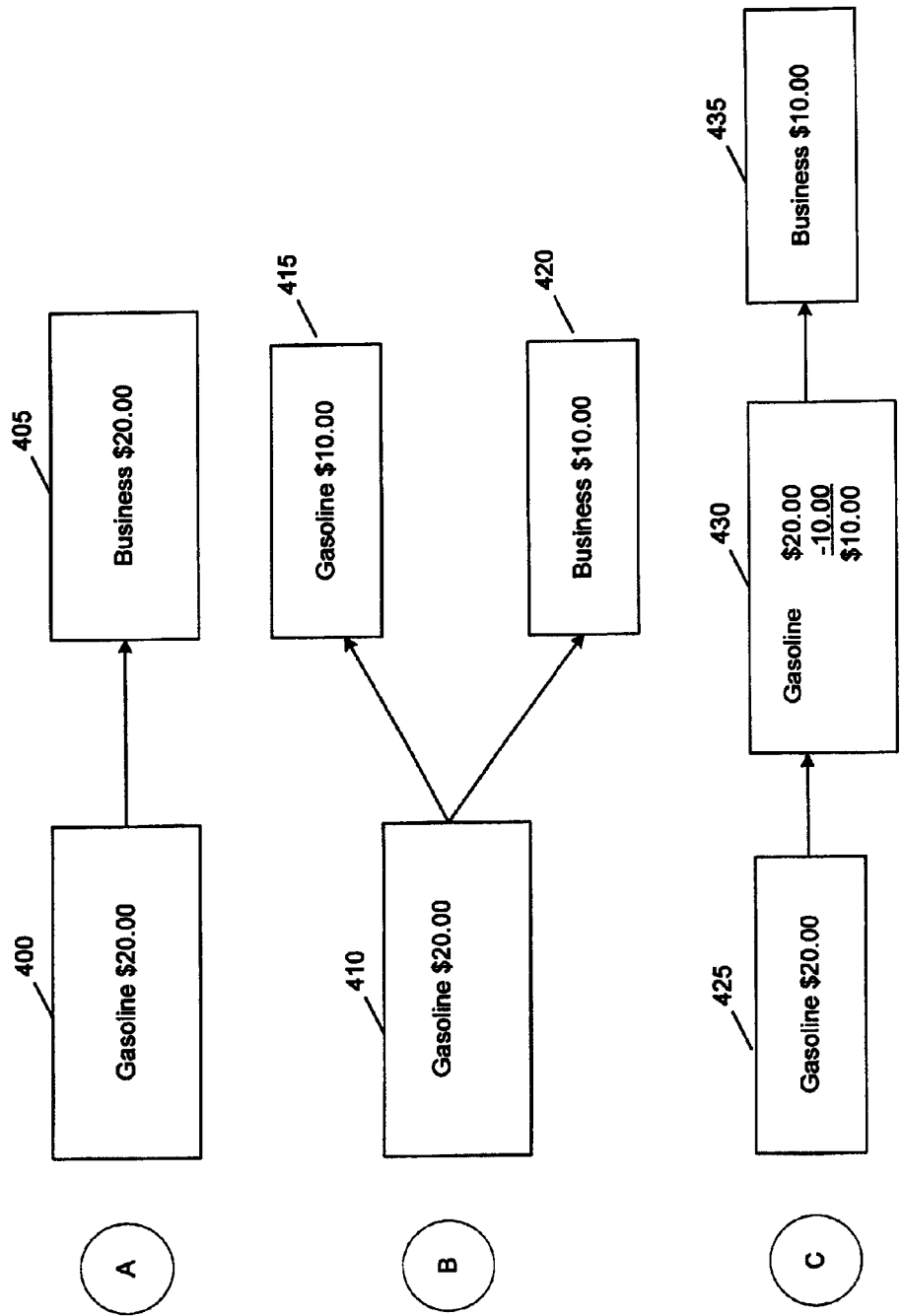
FIG. 4 illustrates several account selection schemes, according to various embodiments of the invention.

FIG. 4 illustrates three process flows A-C depicting various schemes for selecting accounts according to various embodiments of the systems and methods described herein. The examples shown are based on use of device 305 and its accounts as described in FIG. 3. In scheme A, a twenty dollar transaction at a gasoline station may initially be posted to account 310, as shown at 400. The transaction may be posted to the account once: (1) the customer provides the merchant representative with an account number corresponding to account 310; (2) the customer or the merchant representative swipes device 305 (or more particularly the account identifier corresponding to account 310); or (3) rules or parameters corresponding to device 305, the user, the merchant, the issuer or any other individual or entity may require, recommend or designate account 310. The initial posting of the transaction may of course be changed by the customer or dynamically according to rules or parameters. For example, a few days after entering into the transaction, the customer may decide to switch the balance to his business account because the gasoline was used for business purposes. To do so, the customer may make such designation by interacting with an interface associated with station 105, for example, or contacting a service representative of station 105. Other methods for designating accounts are possible.

Scheme B shows the initial transaction being broken up based on amount of transaction. Thus, if the customer used half of the gasoline for personal use and the other half for business purposes, he may designate that $10.00 be posted to the business account as shown in 420. Scheme C shows the user applying a $10 payment to the balance in the gasoline account 310 (at step 430) and thereafter transferring the remaining balance to business account 316. In some embodiments, the $10 payment may be made after the balance is transferred to the business account. In some embodiments, post-transaction designations may be made according to rules or parameters. For example, if an account balance has remained in a given account for a long period of time, the systems and methods described herein may prompt or query the account holder whether the balance needs to be moved to another account, such as, for example, a debit account where payment may be made immediately. Similarly, if a transaction with a given merchant remains in an account for period of time without payment being made, the various systems and methods described herein may remind the user of the outstanding balance and propose a payment schedule.

Figure 5:
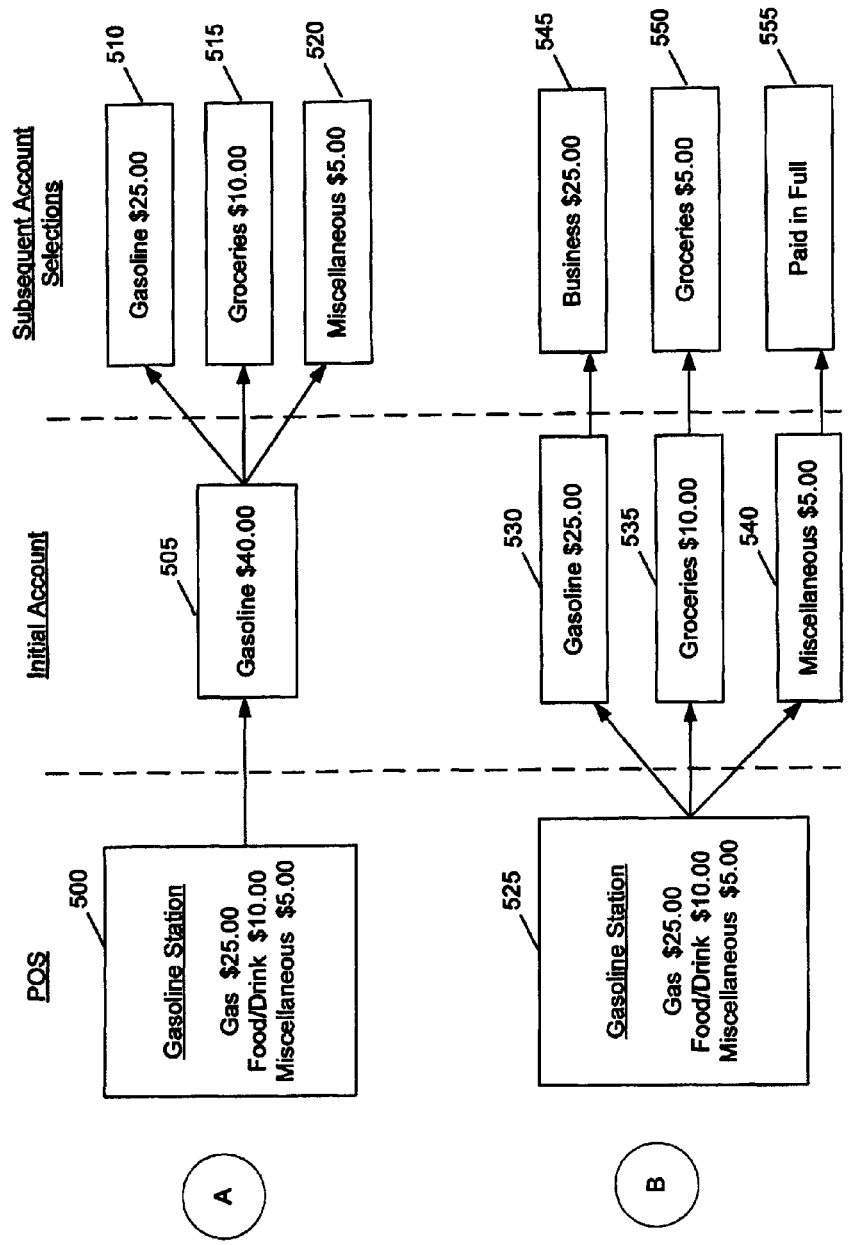
FIG. 5 illustrates several account selection schemes, according to various embodiments of the invention.

FIG. 5 illustrates two process flows A and B depicting various schemes for selecting accounts based on particulars of the goods or services purchased, according to various embodiments of the systems and methods described herein. The examples shown are based on use of device 305 and its accounts as described in FIG. 3. In scheme A, a $40 transaction at a gasoline station may break down as follows: $25 for gasoline; $10 for food and drink; and $5 for miscellaneous items. As shown in 505, the initial account selected may comprise account 310 to which the entire $40 amount will be posted. The initial selection may be made by the customer or rules and parameters that designate the account based on the merchant's identity, for example. Subsequently, the customer may designate certain portions of the transaction that should be posted to different accounts. Thus, $10 should be posted to account 312 (groceries), $5 to account 318 miscellaneous, and the remaining $25 should remain in account 310. In scheme B, the initial account designations are based on the identity of the good or service purchased. Thus, $25 to account 310; $10 to account 312 and $5 to account 318. Subsequently, the customer may re-designate or pay accounts according to his needs. Thus, the $25 may be transferred to account 316 (business), half of the balance in account 312 is paid, and the miscellaneous balance is paid in full. As in scheme A, the initial account selections may be made by the customer or according to rules and parameters that designate account(s) based on the merchant's identity, for example, and other transaction particulars. The above schemes are intended as examples an do not limit the types of schemes that are possible using the systems and methods described herein.

Figure 6:
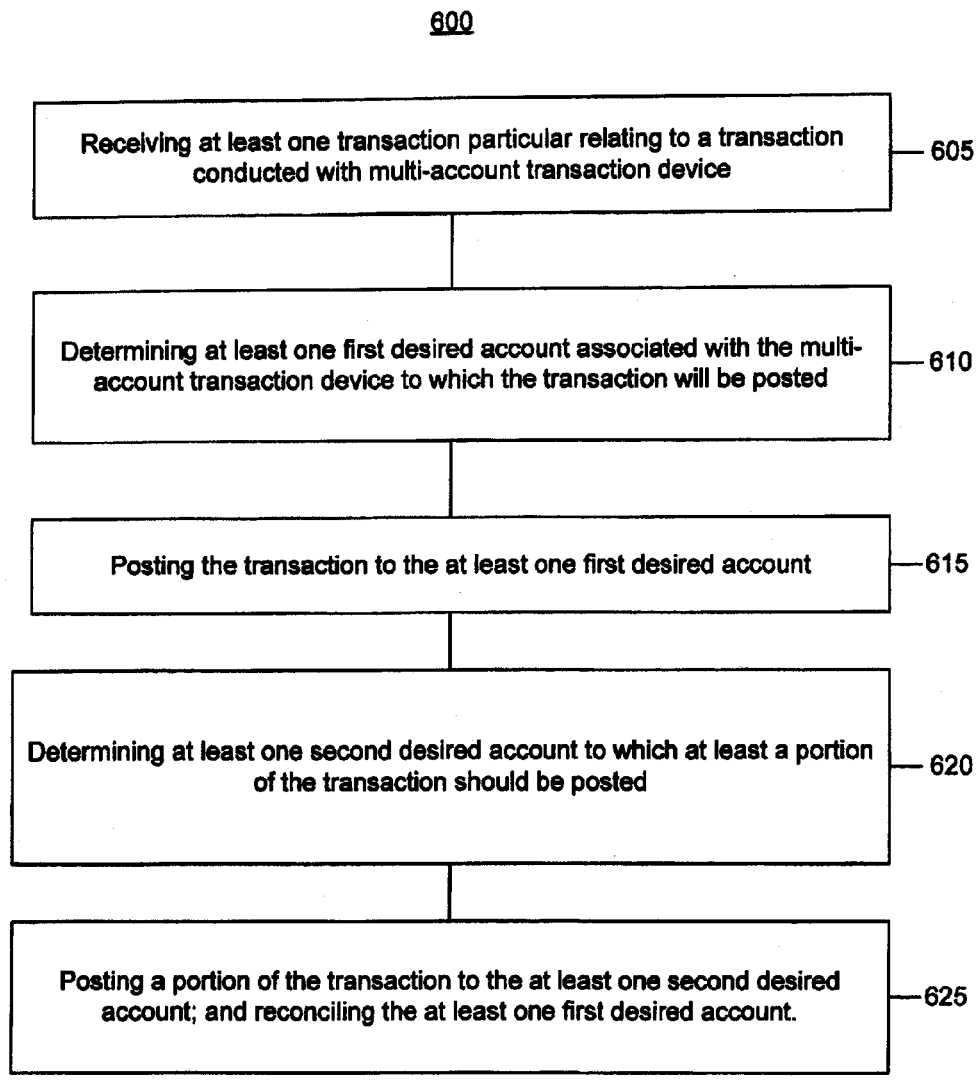
FIG. 6 illustrates a process flow 600 for selecting account(s), according to various embodiments of the invention.

FIG. 6 illustrates a process flow 600 for processing transactions using a multi-account transaction device. At step 605, at least one transaction particular relating to a transaction conducted with a multi-account transaction device is received. In some embodiments, the transaction particular is received from a merchant or an agent or system that processes transactions on behalf of merchants or other entities. At step 610, at least one first desired account associated with the multi-account transaction device to which the transaction will be posted is determined. At step 615, the transaction is posted to the at least one first desired account. At step 620, at least one second desired account designation to which at least a portion of the transaction should be posted is received. At step 625, the at least a portion of the transaction is posted to the at least one second desired account. At step 630, the at least one first desired account are reconciled.

Hereinafter, aspects of implementation of the invention will be described. As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to contribution of money or funds to a transactions device, the principles herein are equally applicable to the contribution of any type of benefit, reward or other value that may identified and contributed to a transactions device. In addition, although many of the embodiments disclosed herein have been described with reference to a savings and transactions processing station that is associated with an administrator of financial instrument or device programs, such as a bank, for example, it should be appreciated that various aspects of the invention may be accomplished when various system components are located elsewhere or administered by other individuals or entities. For instance, the account selection processing station 105 described herein may be maintained and administered by a third party service provider. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. A method for processing transactions using a multi-account transaction card, comprising:

providing a customer with a multi-account transaction card, the multi-account transaction card including a first account identifier and a second account identifier, wherein only one of the first account identifier and the second account identifier is available for initiation at any time;

receiving a desired account identifier selected from the group consisting of the first account identifier and the second account identifier; and posting the transaction to a desired account associated with the desired account identifier;

wherein the multi-account transaction card comprises:

a first portion comprising the first account identifier;

a second portion comprising the second account identifier; and a hinge connecting the first portion and the second portion, wherein the first and second portion are movable between a first position wherein the first account identifier is available for initiation, and a second position where the second account identifier is available for initiation.

2. The method of claim 1, wherein the desired account identifier is received at a point of sale device.

3. The method of claim 1, wherein each of the account identifiers comprises a magnetic stripe.

4. The method of claim 1, wherein each of the account identifiers comprises a RFID device.

5. The method of claim 1, wherein one of the account identifiers is associated with a credit account, and one of the account identifiers is associated with a debit account.

6. The method of claim 1, wherein one of the account identifiers is associated with a stored value account.

7. A multi-account transaction card, comprising:

a first portion comprising a first account identifier;

a second portion comprising a second account identifier; and a hinge connecting the first portion and the second portion, wherein the first and second portion are movable between a first position wherein only the first account identifier is available for initiation, and a second position where only the second account identifier is available for initiation.

8. The multi-account transaction card of claim 7, wherein each of the account identifiers comprises a magnetic stripe.

9. The multi-account transaction card of claim 7, wherein each of the account identifiers comprises a RFID device.

10. The multi-account transaction card of claim 7, wherein at least one of the first portion and the second portion comprises a metallic substrate.

11. The multi-account transaction card of claim 7, wherein the first account identifiers is associated with a credit account, and the second account identifiers is associated with a debit account.

12. The multi-account transaction card of claim 7, wherein one of the account identifiers is associated with a stored value account.

13. The multi-account transaction card of claim 7, further comprising a closing mechanism.

* * * * *